Patented Sept. 11, 1934

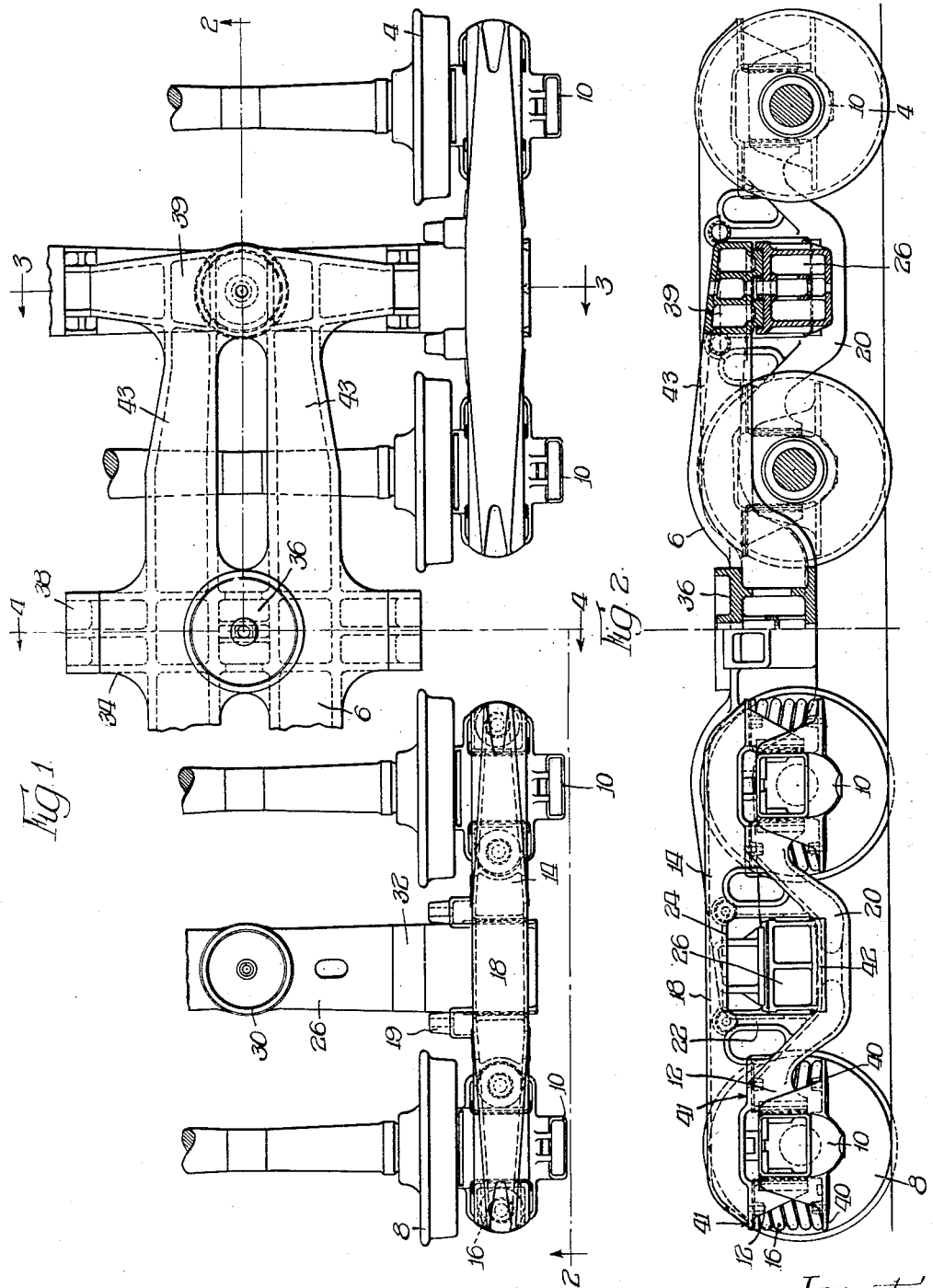

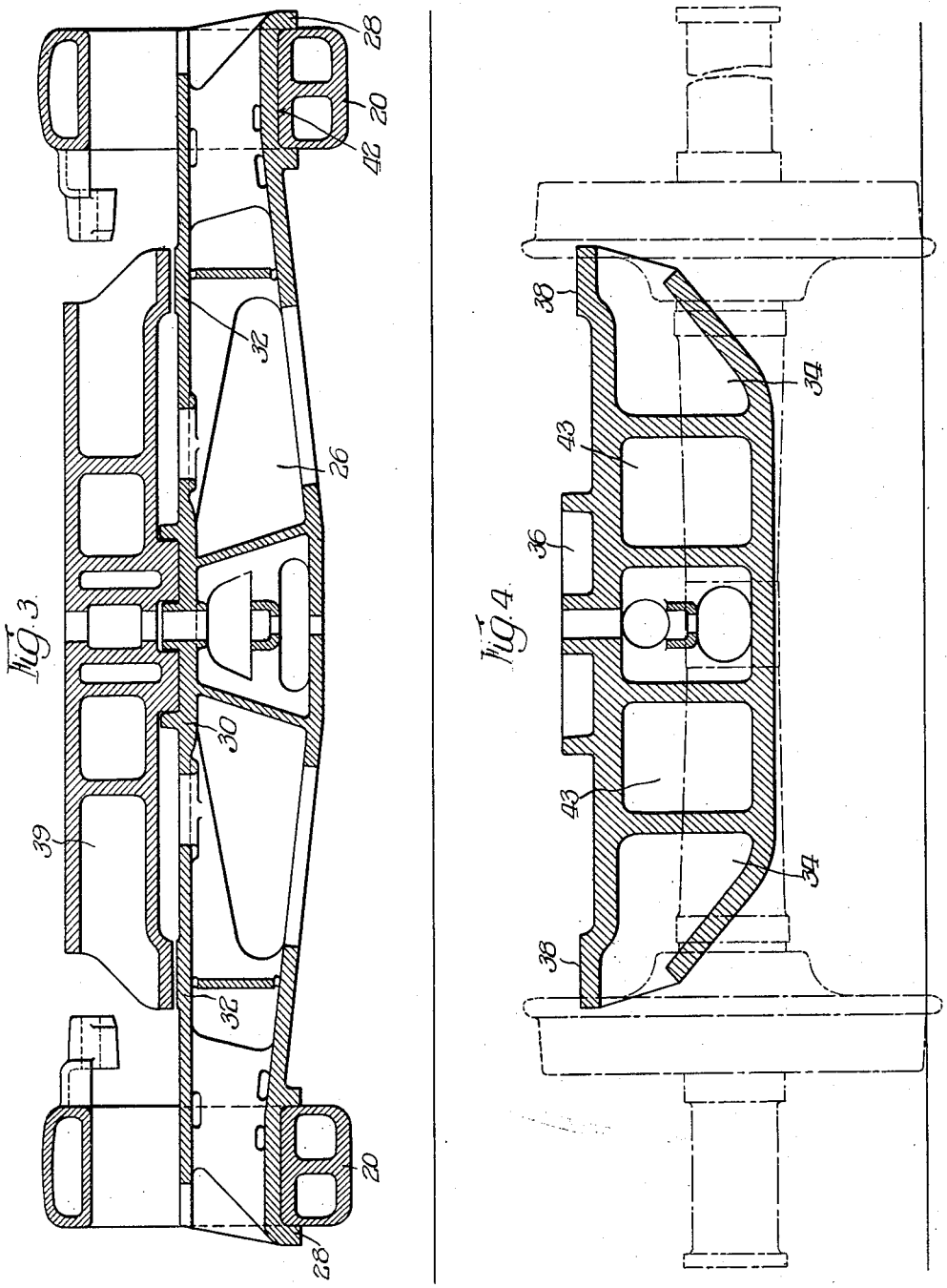

1,972,934

UNITED STATES PATENT OFFICE

1,972,934

TRUCK

William C. Hedgcock, Wilmette, Ill., assignor to American Steel Foundries, Chicago, Ill., a corporation of New Jersey Application July 10, 1931, Serial No. 549,828

13 Claims. (Cl. 105—183)

The present invention relates to car truck assemblies, and more in particular to eight wheel car truck assemblies.

Among the objects of the present invention is to provide a novel car truck comprising an operative assembly of a pair of four wheel truck units, these units being constructed in such a manner as to provide a resulting truck assembly having a relatively short wheel base, as likewise a relatively small overall height, thereby adapting the same for use where eight wheel truck assemblies of the usual kind cannot be used on account of space limitations.

Heretofore and at the present time, in the construction of cars for transporting loads of great weight, it has been found desirable to provide truck constructions preferably including eight wheels and four axles for distribution of the loads over the roadbed, and to keep wheel and journal loads within safe limits. However, by nature of the heavy loads carried, the car body must be of massive construction to carry the same, and this restricts the space available for the trucks in a vertical direction. Also, it is desirable to avoid any unnecessary length of span between truck centers, and as such car bodies are usually depressed between the trucks, the span of the body is partly dependent upon the truck wheel base. It is therefore desirable to reduce the truck wheel base as much as possible as, thereby, the span and length of the car are reduced. Eight wheel trucks comprising a connected pair of four wheel units, the assembly having a common swiveling center, have been used for such cars, but in previous constructions of this type, it has not been possible to shorten the wheel base thereof, inasmuch as the spring planks thereof connecting the side frames of the units would interfere with the brake beams. Furthermore, in a truck construction of this type, the vertical height of the secondary center plates on the bolsters of the four wheel units was more or less fixed by the spring planks and associated structure including the springs or other cushioning means supporting the bolsters.

It is therefore an object of the present invention to provide a truck construction varying from the one above described, in that the wheel base is materially shortened and wherein the vertical height of the secondary center plates is very appreciably decreased, thereby adapting the same for use under restrictive conditions of service, and at the same time provide a truck structure having good spring suspension and simple construction, and affording safe operation.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view disclosing a car truck assembly made in accordance with the present invention;

Figure 2 is a view taken in the planes represented by the line 2—2 of Figure 1 of the drawings;

Figure 3 is a vertical transverse cross-sectional view taken in a plane represented by line 3—3 of Figure 1 of the drawings; and Figure 4 is a vertical transverse cross-sectional view taken in a plane represented by line 4—4 of Figure 1 of the drawings.

Referring now more in detail to the drawings, an embodiment selected to illustrate the present invention is shown in connection with an eight wheel car truck assembly, comprising two four wheel car truck units 2 and 4, operatively connected together by a span bolster 6.

The four-wheel units 2 and 4 are of a construction similar to the car trucks disclosed in a copending application, Serial No. 552,154, filed July 21, 1931, and comprise wheels 8 provided with journal boxes 10 guided for vertical motion in pedestal portions 12 of side frames 14 of the truss type. Spring seats 40 are provided on opposite sides of the journal boxes 10 and partially embrace the side frame pedestal 12 for guiding action therewith. On the journal box spring seats 40 are mounted the springs 16 which support the side frames, and thereby the superimposed truck structure, the engagement between the springs 16 and the side frames being on the side frame spring seats 41 partially embraced by the pedestal structures 12.

Each of the side frames 14 of the four wheel truck units is provided with a top compression portion 18 having brake hanger brackets 19 and a lower tension portion 20, integral column guides 22 being provided therebetween and in spaced relation to provide a bolster opening 24 to receive an end of a transverse bolster 26, the portion of the tension member 20 between the columns forming a bolster seat 42.

Each of the ends of these transverse bolsters 26 rests directly on the side frame bolster seat 42 and is provided with downwardly extending and spaced flanges 28 adapted to embrace the tension member 20 for lateral connection therewith and for spacing the side frames. Each of these transverse bolsters is provided with a center bearing 30 and side bearings 32 cooperating with corresponding bearing portions provided at the box section end portions 39 of the span bolster 6. These center and side bearings of these bolsters are of such a construction as to permit relative angular motion between the four-wheel units 2 and 4 and the span bolster 6.

The span bolster 6 has the longitudinal pair of box girders 43 integrally connecting the end portions 39, thereby cooperatively connecting the two four-wheel units into an eight-wheel truck, and also serving to support the car body on the centrally disposed center bearing 36.

The span bolster 6 is further provided with a transverse integral box section portion 34 disposed beneath the center bearing 36 and extending outwardly to provide supports for the side bearings 38 cooperating with similar bearing portions provided on the car body. The center bearing 36 is of a construction similar to the center bearing 30 of the transverse bolster, whereby relative angular movement is permitted between the car body and span bolster.

It will be quite apparent from the drawings, that the wheel base of the present car truck assembly is greatly reduced over the wheel base of previously known car truck assemblies of this type, this decrease in the wheel base of the assembly being effected by supporting the bolsters 26 directly on the side frames at 42, whereby the side frames are also connected transversely of the truck, thus eliminating the use of a spring plank. Furthermore, it will be readily appreciated that, by disposing the springs between the journal boxes and side frames, the transverse bolsters are directly supported by the tension members of the side frames of the car truck units, affording a low mounting for the transverse bolsters so that the vertical height of the secondary center plates of the car construction has been greatly decreased relative to the same members in car truck assemblies heretofore known. This in turn affords a lower mounting for the span bolster, whereby the truck may be used under low cars.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a span bolster, the combination of spaced longitudinal box girders, transverse box girders at each end thereof, and a centrally disposed transverse box girder, said transverse box girders being each provided with a center bearing and side bearings.

2. In a car truck assembly, the combination of car truck units having side frame members, transverse bolsters spanning between said members, each of said bolsters having spaced bearing portions, and a span bolster extending between said transverse bolsters for support of a car body and having bearings cooperating with the bearings of said transfer bolsters.

3. In a car truck assembly, the combination of car truck units having side frame members, transverse bolsters spanning between said members and directly supported thereon, each of said bolsters having spaced bearing portions, and a span bolster extending between said transverse bolsters for support of a car body and having bearings cooperating with the bearings of said transverse bolsters.

4. In a car truck assembly, the combination of car truck units having side frame members, transverse bolsters embracing a portion of said members and directly supported thereon, each of said bolsters having spaced bearing portions, and a span bolster extending between said transverse bolsters for support of a car body and having bearings cooperating with the bearings of said transverse bolsters.

5. In a car truck assembly, the combination of car truck units having side frame members, transverse bolsters spanning between said members, each of said bolsters having spaced bearing portions, and a span bolster extending between said transverse bolsters for support of a car body, said span bolster having transversely disposed portions provided with bearing portions cooperating with said bearing portions of said transverse bolsters.

6. In a car truck assembly, the combination of car truck units having side frame members, transverse bolsters spanning between said members, and a span bolster extending between said transverse bolsters, said span bolster having spaced bearing portions intermediate its ends cooperating with bearing portions associated with a car body for support thereof.

7. In a car truck assembly, the combination of car truck units having side frame members, transverse bolsters spanning between said members, and a span bolster extending between said transverse bolsters, said span bolster having a substantially centrally disposed girder portion having spaced bearing portions cooperating with bearing portions associated with a car body for support thereof.

8. In a car truck assembly, the combination of car truck units having side frame members, transverse bolsters spanning between said members, a span bolster extending between said transverse bolsters, said span bolster having a plurality of transversely disposed girder portions, certain of said girder portions having bearings cooperating with bearings on said transverse bolster, other of said girder portions having spaced bearings cooperating with bearings associated with a car body for support thereof.

9. In a car truck assembly, the combination of car truck units having side frame members, transverse bolsters spanning between said members, and a span bolster extending between said transverse bolsters, said span bolster having transversely disposed girder portions provided with bearings cooperating with bearings on said transverse bolsters, said span bolster having a substantially centrally disposed girder portion having bearing portions cooperating with bearing portions associated with a car body for support thereof.

10. In a car truck assembly, the combination of car truck units having side frame members, transverse bolsters spanning between said members, and a span bolster extending between said transverse bolsters and having transversely disposed girder portions supported thereon, said span bolster having another transversely disposed girder portion for support of a car body.

11. In a car truck assembly, the combination of car truck units having side frame members, transverse bolsters extending between said members and directly supported thereon, said bolsters having center and side bearings, and a span bolster having transversely disposed girder portions having bearings cooperating with the bearings of said transverse bolsters, said span bolster having a transversely disposed girder portion between said first-named girder portions and having center and side bearings cooperating with similar bearings associated with a car body for support thereof.

12. In a car truck assembly, the combination of car truck units each comprising spaced wheel and axle assemblies, side frame members extending between said assemblies, cushioning means between said assemblies and side frame members, transverse bolsters extending between said members and directly supported thereon, said bolsters having center and side bearings, and a span bolster having transversely disposed girder portions having bearings cooperating with the bearings of said transverse bolsters, said span bolster having a transversely disposed girder portion between said first-named girder portions and having center and side bearings cooperating with similar bearings associated with a car body for support thereof.

13. In a car truck assembly, the combination of car truck units each comprising spaced wheel and axle assemblies, side frame members extending between said assemblies, cushioning means between said assemblies and side frame members, transverse bolsters spanning between said side frame members, and a span bolster extending between said transverse bolsters and having transversely disposed girder portions supported thereon, said span bolster having another transversely disposed girder portion for support of a car body.

WILLIAM C. HEDGCOCK.